No. 804,117. PATENTED NOV. 7, 1905.
J. GUELIG.
PEA AND CLOVER HARVESTER.
APPLICATION FILED APR. 6, 1905.

Witnesses
C. Muntzer
C. H. Griesbauer.

Inventor
Joseph Guelig
by H. B. Wilson
Attorney

UNITED STATES PATENT OFFICE.

JOSEPH GUELIG, OF LENA, WISCONSIN.

PEA AND CLOVER HARVESTER.

No. 804,117.  Specification of Letters Patent.  Patented Nov. 7, 1905.

Application filed April 6, 1905. Serial No. 254,207.

*To all whom it may concern:*

Be it known that I, JOSEPH GUELIG, a citizen of the United States, residing at Lena, in the county of Oconto and State of Wisconsin, have invented certain new and useful Improvements in Pea and Clover Harvesters; and I do declare the following to be a full, clear, and exact description of the invention, such as will enable others skilled in the art to which it appertains to make and use the same.

My invention relates to improvements in attachments for mowing-machines designed to be used in connection with a mowing-machine when cutting peas and clover-hay; and it consists in the construction, combination, and arrangement of devices hereinafter described and claimed.

Figure 1:
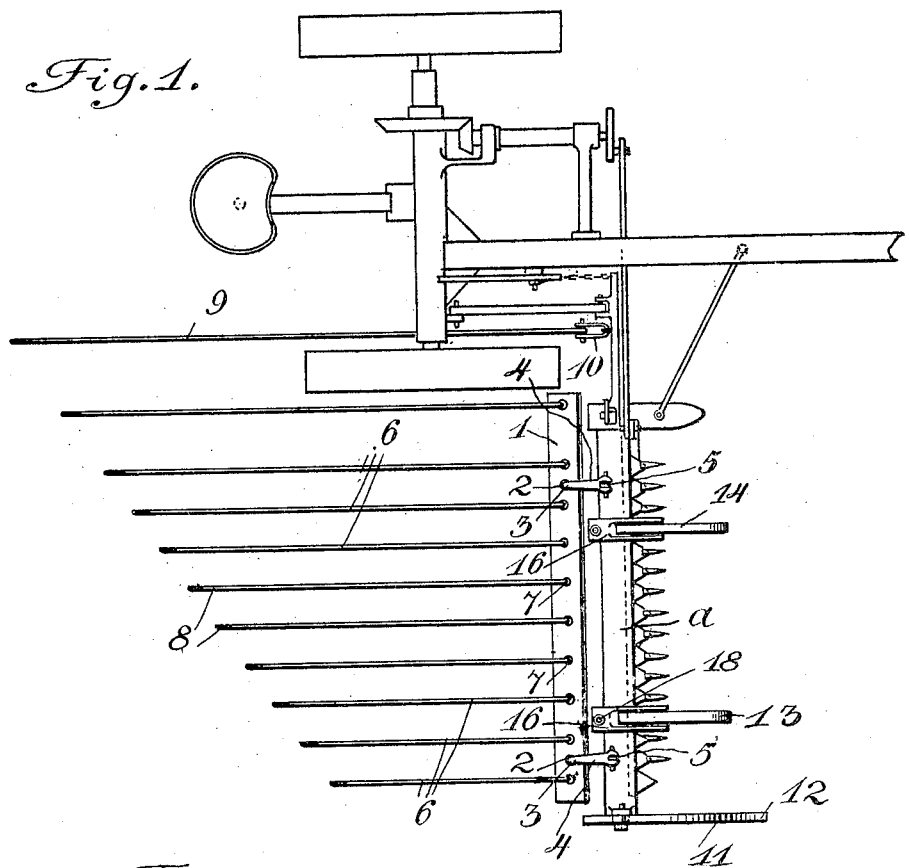
Figure 2:
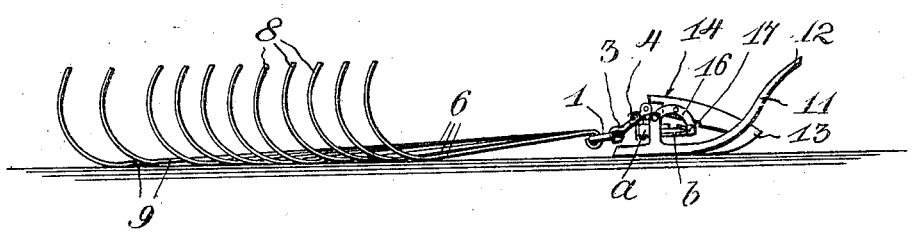
Figure 3:
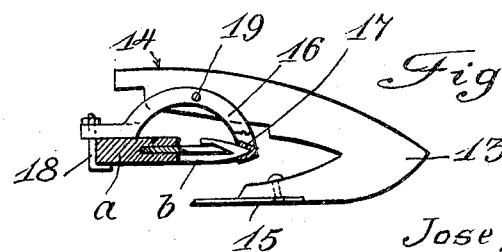

In the accompanying drawings, Figure 1 is a top plan view of a pea and clover cutting attachment embodying my improvements, showing the same in operative relation to a mowing-machine, the latter being indicated in diagrammatic outlines. Fig. 2 is a side elevation of the same, and Fig. 3 is a detail vertical sectional view.

In the embodiment of my invention I provide, a bar 1 which is coincident in length with the finger-bar of a mowing-machine and is here shown as provided at suitable points with openings 2 for the reception of the hooked ends 3 of plates 4, which plates are adapted to be secured to the finger-bar of the machine by means of bolts 5 or other suitable devices. The said bar 1 is disposed on the rear side of the finger-bar of the mower and is provided with a series of rearwardly-extending arms 6, which are appropriately spaced apart and each of which has its front end pivotally connected, as at 7, to the said bar 1. The said arms 6 are preferably made of iron or steel rods and have their rear ends upturned, as at 8. The said arms 6 vary in length, the shortest arm being at the outer end of the bar 1 and each succeeding arm being longer, so that the said arms 6 become lengthened as they approach the inner end of the bar 1. Hence the upturned rear end portions 8 of the said arms 6 are disposed in a line which is oblique to the bar 1. I also provide a supplemental arm 9, which is similar in construction to the bars 6, but is somewhat longer than the longest of said arms 6. The front end of the supplemental arm 9 is connected, by means of a clevis 10 or other suitable device, to the brace of the mower at a point near the inner wheel thereof.

At the outer end of the finger-bar $a$ of the mower is a dividing-runner 11, which is detachably secured thereto and the front portion of which is upturned, as at 12. In connection with the runner and the devices hereinbefore described I also employ a suitable number of lifting-guards 13, which are suitably spaced apart and are disposed transversely with respect to the finger-bar and longitudinally with respect to the line of draft. Each of the said lifting-guards has a rearwardly-inclined upper side 14 and is provided on its under side with a runner 15. Clips 16 are employed to detachably connect the lifting-guards to the finger-bar and to permit of vertical angular movement of said lifting-guards, so that each is free to move vertically independently of the others and of the cutting apparatus of the mower, and hence cause all of the lifting-guards to remain in contact with the surface of the ground when the mower is passing over uneven ground. Each of the clips 16 is provided at its front end with a socket 17 to fit on the front end of one of the fingers $b$ and is provided at its rear end with a device (here shown as a bent bolt 18) to detachably clamp it to the finger-bar $a$. The said lifting-guards are pivotally connected to the said clips, as at 19, and the said clips coact with the pivot to support the guards in a vertical position and to retain them in such position under all conditions and permit of their vertical angular movement.

In the operation of my invention the runner 11 serves to divide the swath which is being cut from the standing peas or clover, and the guards 13 serve to subdivide the swath, to lift the peas and clover, and to cause the same to be so disposed as to enable them to be squarely cut by the cutting apparatus of the mower and to leave an even stubble. The vines as they are cut fall upon the arms 6 of the gathering device, which comprises said arms and the bar 1. The upturned rear ends 8 of the said bars cause the cut vines to accumulate on the said gathering-arms, and the oblique arrangement of the said rear upturned ends 8 of said arms causes the vines to be discharged laterally from the gathering device in a windrow which is parallel to the line of draft.

Having thus described my invention, what I claim as new, and desire to secure by Letters Patent, is—

In combination with the cutting apparatus of a mower, an upwardly-arched clip having a socket at its front end fitting on the front end of one of the fingers and having its rear end bearing on and provided with means to detachably clamp it to the finger-bar, and a lifting-guard comprising an upper arm and a lower arm, united together at their front ends, said upper arm having a rearwardly-inclined upper side and pivotally connected near its rear end to the clip, for vertical angular movement, and said lower arm extending rearwardly under the said finger and having at its lower side a rearwardly-extending runner.

In testimony whereof I have hereunto set my hand in presence of two subscribing witnesses.

JOSEPH GUELIG.

Witnesses:
  LEVI HALL,
  C. F. YEATON.